Sept. 11, 1945.   R. M. EVANS ET AL   2,384,612
COMBINATION FIELD-EVENING AND COLOR-CORRECTION PHOTOGRAPHIC MASK
Filed Aug. 6, 1942   2 Sheets-Sheet 1
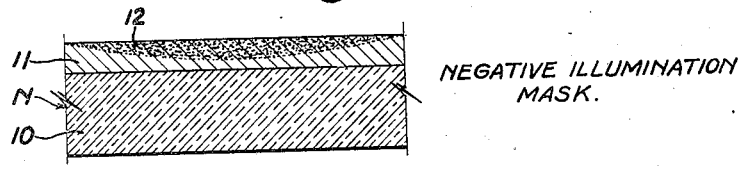
NEGATIVE ILLUMINATION MASK.
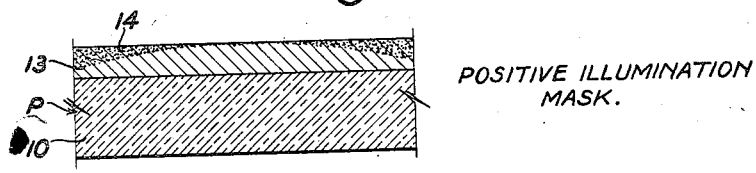
POSITIVE ILLUMINATION MASK.
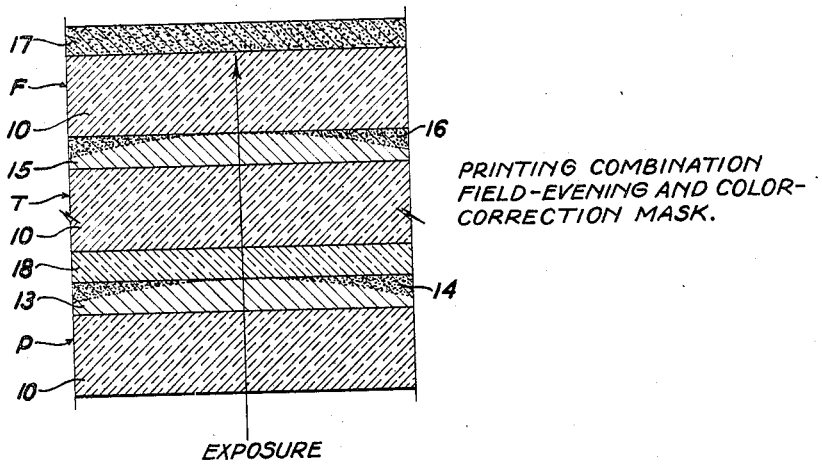
PRINTING COMBINATION FIELD-EVENING AND COLOR-CORRECTION MASK.
Ralph M. Evans
Norma D. Miller
INVENTORS
BY
ATTORNEYS Sept. 11, 1945.   R. M. EVANS ET AL   2,384,612
COMBINATION FIELD-EVENING AND COLOR-CORRECTION PHOTOGRAPHIC MASK
Filed Aug. 6, 1942   2 Sheets—Sheet 2

MASK WITH FIELD-EVENING CHARACTERISTICS.

COLOR TRANSPARENCY.

MASK WITH COLOR-CORRECTION CHARACTERISTICS.

MASK WITH COMBINED FIELD-EVENING AND COLOR-CORRECTION CHARACTERISTICS

Ralph M. Evans
Norma D. Miller
INVENTORS

BY
ATTORNEYS

Patented Sept. 11, 1945

2,384,612

UNITED STATES PATENT OFFICE 2,384,612

COMBINATION FIELD-EVENING AND COLOR-CORRECTION PHOTOGRAPHIC MASK

Ralph M. Evans and Norma D. Miller, Rochester, N. Y., assignors to Eastman Kodak Company, Rochester, N. Y., a corporation of New Jersey Application August 6, 1942, Serial No. 453,876

8 Claims. (Cl. 95—2)

This invention relates to photography and more particularly to a process in color photography of producing a combination field-evening and color-correction mask.

It is well known in the art of color photography that in printing from multicolor originals which consist in whole or in part of dyes, the fact that the light absorption of some of the dyes extends to the whole spectrum rather than being confined to one part of the spectrum makes it impossible to obtain printed records of the individudal dyes simply by restricting the color of the printing light. Since in most three-color photographic processes the three dyes are not equally bad in this respect, the final result of printing such a film is to introduce unequal parts of all three records in each image which is made, regardless of the color of light used in printing or the sensitivity of the photographic materials used.

The deficiencies of dyes constituting the images of multi-color originals and prints made therefrom, may be compensated for to a certain extent by employing the general principles of masking with a negative image either in black-and-white or in color as described in Evans U. S. Patent 2,203,653, granted June 4, 1940; Hanson U. S. Patent 2,294,981, granted September 8, 1942; Evans U. S. patent application, Serial No. 413,442, filed October 3, 1941, and elsewhere. These processes, in general, consist of exposing a sensitive emulsion layer through the subtractive dye image of a multicolor original and developing in the exposed layer a negative masking image which is then combined with the multicolor original when printing color-corrected prints.

In color photography another condition has been observed which may be corrected by imparting an additional characteristic to the negative masks of the prior art.

It has been found that in the well-known reversal processes of subtractive color photography it is not uncommon to obtain as a colored record of a colored scene, a multicolor original which is a faithful reproduction of the scene photographed as far as the color balance is concerned, however, the multicolor original may show increasing density from the center outward. In the conventional square or rectangular colored original due to this condition the corners are noticeably dark compared to the density at the center of the original. This undesirable darkening of the colored photograph at the corners can be attributed to a characteristic which is at some etxent common to all photographic lenses. That is, all lenses give more or less uneven illumination across the field with the result that the perpihery of the field receives less illumination than does the center of the field. The result of using such lenses for the taking lenses for exposing film processed by reversal processes of color photography, is to obtain negative images having density decreasing from the center outward and the reversal image obtained therefrom, accordingly, has density increasing from the center outward. The increment of density from the center of the image varies according to the particular lens in use and the angular field subtended.

Similarly, when an enlargement is made in a reversal process of a multicolored original having density increasing towards the edges, it is found that the enlarger lens accentuates the condition due to the fact that the lens tends to give uneven illumination across the field in the same direction as the original taking lens, and a further increment in density is obtained across the field. This condition, of course, does not result during enlargement in a silver-negative-to-silver-positive process since the fall-off in illumination across the field of the enlarger lens is compensated for somewhat by the increase in density towards the center of the negative.

One method of compensating for the cumulative effects of uneven field illumination of taking and enlarging lenses in the reversal process consists in employing dodging or vignetting during enlargement whereby the printing at the center of the field is held back and enlargements having more or less uniform density across the field are obtained. It is, however, practically impossible with dodging or vignetting to hold back printing towards the center of the field in the amount necessary to exactly compensate for the uneven illumination of the enlarger lens and the color transparency.

Another method of compensating for the cumulative effects of uneven illumination of the taking and enlarging lenses consists in making a negative record of the field illumination of the enlarger lens which record has more density at the center than at the edges of the field, and then combining this negative illumination record with the color transparency having increasing density toward the edges, during printing. The result is to compensate for the uneven field illumination of the enlarger lens and possibly some correction for the uneven density across the color transparency.

Another method of compensating for the uneven illumination of an enlarger lens is to provide the lens with a diffused screen, such as a ground glass plate, giving more diffusion at the center than at the edges of the field. This arrangement is satisfactory for certain purposes but actually increases the time of exposure.

One object of the present invention is to provide a combination field-evening and color-correction mask which is a negative record of a lens system giving uneven illumination across the field and of a multicolor transparency.

Another object of the invention is to provide a combination field-evening and color-correction mask the field-evening characteristics of which are determined by a lens system giving uneven illumination across the field and the color-correction characteristics of which are determined by a multicolor transparency.

Another object of the invention is to provide a combination field-evening and color-correction mask the field-evening characteristics of which are determined both by a lens system giving uneven illumination across the field and a color transparency having density increasing from the center outward and the color-correction characteristics of the mask being determined by said color transparency.

Other objects are to provide methods of producing the combination field-evening and color-correction masks of our invention.

The objects of our invention are accomplished by recording a positive image of the field illumination of a lens system giving uneven illumination across the field and printing from this positive in combination with a color transparency having or not having increasing density from the center outward, a combination field-evening and color-correction image, which image when combined with said color transparency, is used in making prints not showing the effects of unevenness of field illumination of a lens and which prints are color-corrected.

Our invention is illustrated by the accompanying drawings wherein

Fig. 1 is a magnified diagonal cross-section of a negative illumination mask made by exposure to a lens system having uneven illumination across the field.

Fig. 2 shows in magnified diagonal cross-sectional view the appearance of a positive illumination mask made from the negative mask of Fig. 1.

Fig. 3 shows in enlarged diagonal cross-sectional view a method of printing the combination field-evening and color-correction masks of our invention from the positive illumination mask of Fig. 2 and a color transparency having density increasing from the center to the periphery of the field.

Figure 4:
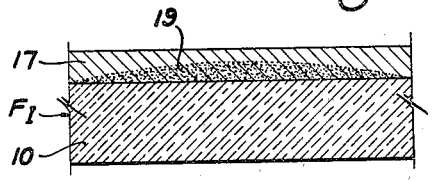
Fig. 4 shows in enlarged diagonal cross-sectional view the appearance of the mask of the inveniton with field-evening characteristics.

Our invention will now be described with particular reference to the accompanying drawings.

In case one has at hand a multicolor original transparency which has density increasing from the center outward (Fig. 5) which condition has resulted from the fact that the original taking lens had uneven field illumination, and the enlarger to be used in printing this transparency gives uneven illumination across the field, the first step in our process is to expose a high contrast silver halide emulsion layer, preferably a photographic plate, to the enlarger lens system or other enlarger lens system arranged to give the required or chosen angular field. The plate is then developed in a developing solution of the following composition:

| | | |
|---|---|---|
| Water, about 125° F | cc | 500 |
| Elon | grams | 1 |
| Sodium sulfite | do | 75 |
| Hydroquinone | do | 9 |
| Sodium carbonate | do | 25 |
| Potassium bromide | do | 5 |
| Water to | liters | 2 |

Development is carried out at 65° F. until a gamma of 3.0 is reached which usually requires about four or five minutes. The plate is then fixed in hypo solution, washed and dried.

The negative illumination mask thus obtained appears as shown in Fig. 1 of the accompanying drawings wherein 10 is a transparent support such as cellulose ester or glass and 11 is a gelatin layer containing the negative record 12 of the field illumination of the enlarger lens. As shown, image 12 has density decreasing from the center outward corresponding to the fall-off in illumination of the lens.

A print the same size as the above negative illumination mask is then made on a medium contrast photographic plate such as an Eastman 33 plate and developed to a gamma of 1.0, eight minutes at 65° F. usually being sufficient with a developer of the following composition:

| | | |
|---|---|---|
| Water, about 125° F | cc | 750 |
| Elon | grams | 2 |
| Sodium sulfite, desiccated | do | 100 |
| Hydroquinone | do | 5 |
| Borax, granular | do | 2 |
| Water to | liter | 1 |

The plate is then fixed, washed, and dried. The plate thus prepared is a positive illumination mask of the field illumination of the enlarger lens and appears as shown in Fig. 2 of the accompanying drawings wherein P indicates the mask itself and layer 10 is the support of a cellulose ester or glass carrying the gelatin layer 13 containing the positive illumination masking image 14 having density increasing from the center outward. This positive image may, if desired, have been formed by reversal of a film first exposed to the enlarger lens system.

Figure 5:
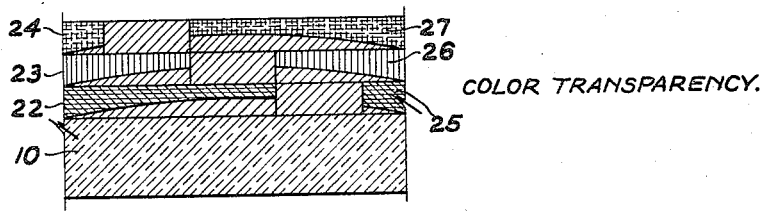
Fig. 5 shows in enlarged diagonal cross-sectional view the appearance of a color transparency having density increasing from the center outward.

As shown in Fig. 3 the final combination field-evening and color-correction mask is obtained by placing the positive illumination mask P in contact with a glass plate 18 and over the glass plate is laid a transparency T composed of a transparent support 10 carrying superposed emulsion layers containing subtractive dye images represented in the figure by the single photographic layer 15 containing image 16 of density increasing from the center outward. It is apparent that transparency T is equivalent to the color transparency shown in Fig. 5 but for purposes of simplicity of illustration the transparency of Fig. 5 is represented in abbreviated form as shown in Fig. 3. Over transparency T is placed a suitable light sensitive masking film F composed of a transparent support 10 and a masking emulsion layer 17. A sensitive masking film suitable for this purpose is that disclosed in Nadeau et al. U. S. Patent 2,266,435, granted December 16, 1941.

As shown in Fig. 3 an exposure is made through mask P and transparency T into film F with proper choice of time, intensity and color of printing light. The choice of the color of the printing light is determined by the type of color-correction characteristics which it is desired to impart to the final mask, for instance, in our preferred method a yellow printing light is used. In other cases, it is desirable to choose a green or red printing light.

After exposure of film F as shown in Fig. 3 it is developed preferably while still laminated to the color transparency T, in a low contrast developer as, for instance, that shown immediately above, development being carried out until a gamma of 0.45 is obtained. After development the mask is fixed, washed and dried. The resulting mask with only its field-evening characteristics appears as shown in Fig. 4 of the accompanying drawings, wherein $F_1$ represents the film itself and 10 is a transparent support carrying the photographic layer 17 containing image 19 representing the field-evening characteristics of the mask.

As mentioned above, transparency T corresponds to the color transparency shown in Fig. 5 wherein layer 10 is a support of cellulose ester or other material carrying photographic layers 22, 23, and 24 containing the cyan, magenta and yellow dye images 25, 26, and 27 respectively, which dye images have increasing density from the center to the edges of the field. As mentioned previously, this variation in density of the dye images is due to errors in field illumination of the taking lens used in exposing the color transparency. If the masking exposure illustrated in Fig. 3 was made with yellow light through a color transparency having the density characteristics shown in Fig. 5, the mask with only its color-correction characteristics may be illustrated as shown in Fig. 6 wherein $F_c$ represents the mask itself having the transparent support 10 carrying the photographic layer 17 containing the color-correction masking image 20.

Figure 6:
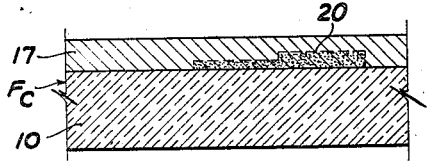
Fig. 6 shows in diagonal cross-sectional view the appearance of the mask of the invention with its color correction characteristics.
Figure 7:
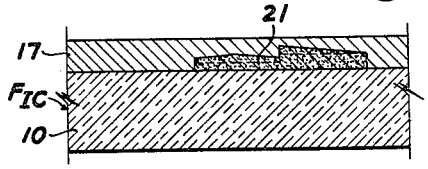
Fig. 7 shows in diagonal cross-sectional view the appearance of the mask of the invention with both field-evening and color-correction characteristics.

It is now seen, when the field evening characteristics shown in Fig. 4 are combined with the color-correction characteristics of the mask, shown in Fig. 6, the mask with its combined field-evening and color-correction characteristics would appear as illustrated in Fig. 7 of the accompanying drawings. In the figure, the mask $F_{tc}$ has the transparent support 10 carrying the photographic layer 17 containing the combined field-evening and color-correction masking image 21 of the invention. As shown, image 21 has not only the field-evening characteristics of image 19 of Fig. 4 but also the color-correction characteristics of image 20 of Fig. 6. The dotted lines within image 21 serve to illustrate the characteristics the image would have had field-evening characteristics not been imparted to it.

It is apparent from the above explanation that the field-evening and color-correction mask of the invention prepared as described and spoken of herein, has its field-evening characteristics determined by both the color transparency and the lens of the enlarger, and the color-correction characteristics are determined solely by the color transparency. The masking image, according to terminology used herein and in the appended claims, may therefore be called a negative record of a lens system giving uneven illumination across the field and of a color transparency having increasing image density from the center outward, the distribution of density of said image approximately compensating for the uneven illumination of the enlarger-lens and the density variations across the color transparency.

When the mask of our invention has been prepared it is then used in combination with the color transparency from which it was made in printing enlargements usually through the same enlarger lens system used in making the illumination mask of Fig. 1, upon a suitable sensitive multilayer color film or separation images may be printed as desired. The record or records are then processed to give color prints in any suitable manner, such as by reversal color-forming development. It is, of course, appreciated that in printing when using the masks of our invention the degree of color-correction falls off toward the edges, however, the overall effect is definitely more satisfactory than in case the ordinary color-correction mask is used.

In case one has at hand a color transparency which does not show increasing density from the center outward and for which it is desired to make a color-correction mask which also has the property of compensating for uneven field illumination of an enlarger, the same process as that above-described is carried out substituting in the exposure step shown in Fig. 3 the transparency of uniform density for that of non-uniform density, with the result that the image of the mask obtained will, as spoken of herein, have its field-evening characteristics determined only by the positive illumination mask and the color-correction characteristics will be determined by the transparency. The image of this mask, according to terminology used herein and in the appended claims, therefore, is a negative record of the field of a lens system giving uneven illumination across the field and of a color transparency.

Our invention does not contemplate ordinary negative color-correction masks made from color transparencies having density increasing from the center outward. Masks of this type give at best little compensation for uneven illumination across the field of a taking lens, and little or no compensation for uneven illumination across the field of an enlarger lens.

Our invention is capable of numerous variations. As mentioned, the field-evening characteristics of the mask depend upon whether the original color transparency shows the effect of uneven field illumination of the taking lens and, therefore, the field-evening characteristics may or may not be determined partially by the color transparency. Of course, the mask always has color-correction characteristics determined by the transparency since it is exposed through the color transparency with a selected exposing light. We may choose for the exposing light of the final mask practically any color of light. Generally, however, since the color transparencies which are in common use tend to yield prints in which the red, yellow, and magenta colors are too luminous in comparison with the blue, green, and cyan colors, we prefer to use a printing light of wave length longer than blue, preferably, a narrow band yellow light or even red light. Practically the only case where we use light in the blue region of the spectrum is the case where the color transparency at hand would yield a print having the blue colors too light and it is desired to place density in the mask back of these colors.

It is not necessary that the exposure of the mask be made simultaneously through the transparency and the positive illumination mask as shown in Fig. 3, for if desired the exposure may first be made through the transparency for a measured time followed by exposure through only the positive illumination mask. In this manner, the relative amounts of field-evening and color-correction characteristics imparted to the mask may be controlled. Conversely, the exposure may be first made through the illumination mask followed by exposure through the color transparency.

In another feature of our invention, the mask after exposure as shown in Fig. 3 may be colored by any suitable means such as by color-forming development to a colored negative mask the color of which is related to the color of the exposing light as described in Evans U. S. patent application, Serial No. 413,442, filed October 3, 1941. For example, if red light is used for the exposure, the mask may be colored yellow, orange, etc., or if green or yellow light exposure is used the mask may be colored yellow.

It will now be apparent to those skilled in the art that it will be necessary to prepare separate illumination masks corresponding to that shown in Fig. 1 of the drawings for the principal magnifications of an enlarger. This requirement is understood when it is considered that the degree of illumination masking required varies with the angular field subtended and the angular field subtended varies with the degree of magnification. Also, while it is preferred, it is not necessary that the same enlarger be used for making the negative illumination mask, as that which is used in the final printing step, because most enlargers set at the same magnification will give approximately the same field-evening characteristics to the mask, however, the mask thus obtained does not compensate as exactly for the illumination defects of the final printing lens. Where we refer in the claims to "said light source," it is understood that we mean either the same light source for both exposures, or light sources of similar field illumination characteristics.

It is to be understood that the disclosure herein is by way of example and that we consider as included in our invention all modifications and equivalents falling within the scope of the appended claims.

What we claim is:

1. The method of forming a color-corrected print by exposure through a color transparency and a lens system giving a field of illumination decreasing in intensity from the center outward, which comprises exposing a light-sensitive silver halide emulsion layer to a light source through a lens system giving a field, developing in the exposed emulsion layer a positive image of said field, said image having density increasing from the center outwards, exposing a light-sensitive silver halide emulsion layer through said positive image and said color transparency, developing in said last-mentioned exposed layer a negative image, exposing a suitable sensitive photographic element through said negative image, said color transparency and said first-mentioned lens system to said light source, and developing a color print from said exposed photographic element.

2. The method of forming a combination field-evening and color-correction photographic mask having field-evening characteristics determined by a lens system giving a field of illumination decreasing in intensity from the center outward and color-correction characteristics determined by a color transparency, which comprises exposing a light-sensitive silver halide emulsion layer to a light source through said lens system, developing said exposed layer a positive image having density increasing from the center outward, exposing a light-sensitive silver halide emulsion layer to said light source through said positive image and said color transparency, and developing in said last-mentioned exposed emulsion layer a negative image.

3. The method of forming a combination field-evening and color-correction photographic mask having field-evening characteristics determined by a lens system giving a field of illumination decreasing in intensity from the center outward and color-correction characteristics determined by a color transparency, which comprises exposing a light-sensitive silver halide emulsion layer to a light source through said lens system, developing in the exposed layer a negative image having density decreasing from the center outward, printing from said negative image a positive image having density increasing from the center outward, exposing a light-sensitive silver halide emulsion layer to said light source through said positive image and said color transparency with a band of visible light of wave length longer than blue, and developing in said last-mentioned exposed emulsion layer a negative image.

4. The method of forming a combination field-evening and color-correction photographic mask having field-evening characteristics determined by a lens system giving a field of illumination decreasing in intensity from the center outward and color-correction characteristics determined by a color transparency, which comprises exposing a light-sensitive silver halide emulsion layer to a light source through said lens system, developing in the exposed layer a negative image having density decreasing from the center outward, printing from said negative image a positive image having density increasing from the center outward, exposing a light-sensitive silver halide emulsion layer to said light source through said positive image and said color transparency with yellow light, and developing in said last-mentioned exposed emulsion layer a negative image.

5. The method of forming a combination field-evening and color-correction photographic mask having field-evening characteristics determined both by a lens system giving a field of illumination decreasing in intensity from the center outward and a color transparency having density increasing from the center outward and color-correction characteristics determined by said color transparency, which comprises exposing a light-sensitive silver halide emulsion layer to a light source through said lens system, developing in the exposed layer a negative image having density decreasing from the center outward, printing from said negative image a positive image having density increasing from the center outward, exposing a light-sensitive silver halide emulsion layer to said light source through said positive image and said color transparency, and developing in said last-mentioned exposed emulsion layer a negative image.

6. The method of forming a combination field-evening and color-correction photographic mask having field-evening characteristics determined both by a lens system giving a field of illumination decreasing in intensity from the center outward and a color transparency having density increasing from the center outward and color-correction characteristics determined by said color transparency, which comprises exposing a light-sensitive silver halide emulsion layer to a light source through said lens system, developing in the exposed layer a negative image having density decreasing from the center outward, printing from said negative image a positive image having density increasing from the center outward, exposing a light-sensitive silver halide emulsion layer to said light source through said positive image and said color transparency with visible light of wave lengths longer than blue, and developing in said last-mentioned exposed emulsion layer a negative image.

7. The method of forming a combination field-evening and color-correction photographic mask having field-evening and color-correction characteristics determined both by a lens system giving a field of illumination decreasing in intensity from the center outward and a color transparency having density increasing from the center outward and color-correction characteristics determined by said color transparency, which comprises exposing a light-sensitive silver halide emulsion layer to a light source through said lens system, developing in the exposed layer a negative image having density decreasing from the center outward, printing from said negative image a positive image having density increasing from the center outward, exposing a light-sensitive silver halide emulsion layer to said light source through said positive image and said color transparency with yellow light, and developing in said last-mentioned exposed emulsion layer a negative image.

8. The method of forming a combination field-evening and color-correction photographic mask having field-evening characteristics determined both by a lens system giving a field of illumination decreasing in intensity from the center outward and a color transparency having density increasing from the center outward and color-correction characteristics determined by said color transparency, which comprises exposing a light-sensitive silver halide emulsion layer to a light source through said lens system, developing in the exposed layer a negative image having density decreasing from the center outward, printing from said negative image a positive image having density increasing from the center outward, exposing a light sensitive silver halide emulsion layer to said light source through said positive image and said color transparency with red light, and developing in said last-mentioned exposed emulsion layer a negative image.

RALPH M. EVANS.
NORMA D. MILLER.